(12) United States Patent
Baruch et al.

(10) Patent No.: US 10,019,194 B1
(45) Date of Patent: Jul. 10, 2018

(54) EVENTUALLY CONSISTENT SYNCHRONOUS DATA REPLICATION IN A STORAGE SYSTEM

(71) Applicant: EMC IP Holding Company, LLC, Hopkinton, MA (US)

(72) Inventors: Leehod Baruch, Rishon Leziyon (IL); Assaf Natanzon, Tel Aviv (IL); Jehuda Shemer, Kfar Saba (IL); Amit Lieberman, Raanana (IL); Ron Bigman, Holon (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 8 days.

(21) Appl. No.: 15/274,122

(22) Filed: Sep. 23, 2016

(51) Int. Cl.
G06F 12/00 (2006.01)
G06F 13/00 (2006.01)
G06F 3/06 (2006.01)

(52) U.S. Cl.
CPC .............. *G06F 3/065* (2013.01); *G06F 3/067* (2013.01); *G06F 3/0611* (2013.01); *G06F 3/0619* (2013.01); *G06F 3/0644* (2013.01); *G06F 3/0659* (2013.01)

(58) Field of Classification Search
CPC ................................ G06F 12/00; G06F 13/00
USPC ......................................... 711/100, 154, 162
See application file for complete search history.

(56) References Cited

U.S. PATENT DOCUMENTS

| | | |
|---|---|---|
| 5,170,480 A | 12/1992 | Mohan et al. |
| 5,249,053 A | 9/1993 | Jain |
| 5,388,254 A | 2/1995 | Betz et al. |
| 5,499,367 A | 3/1996 | Bamford et al. |
| 5,526,397 A | 6/1996 | Lohman |
| 5,864,837 A | 1/1999 | Maimone |
| 5,879,459 A | 3/1999 | Gadgil et al. |
| 5,990,899 A | 11/1999 | Whitten |
| 6,042,852 A | 3/2000 | Hyun et al. |
| 6,065,018 A | 5/2000 | Beier et al. |
| 6,143,659 A | 11/2000 | Leem |
| 6,148,340 A | 11/2000 | Bittinger et al. |
| 6,174,377 B1 | 1/2001 | Doering et al. |

(Continued)

FOREIGN PATENT DOCUMENTS

EP 1154356 11/2001
WO WO 00 45581 A3 8/2000

OTHER PUBLICATIONS

U.S. Appl. No. 15/274,362, filed Sep. 23, 2016, Baruch et al.

(Continued)

*Primary Examiner* — Tuan Thai
(74) *Attorney, Agent, or Firm* — Daly, Crowley Mofford & Durkee, LLP

(57) ABSTRACT

Described embodiments provide systems and methods for operating a storage system. One or more production volumes of the storage system are selected for continuous replication. A number, N, is selected that is associated with a number of damaged volumes the storage system can sustain and maintain data consistency. Write transactions from a host to an associated one of the selected one or more production volumes are intercepted. The intercepted write transactions are sent to the associated production volume and to a plurality of copy volumes. When acknowledgments of the write transaction have been received from N copy volumes, the write transaction is acknowledged to the host.

17 Claims, 6 Drawing Sheets

(56) References Cited

U.S. PATENT DOCUMENTS

| | | |
|---|---|---|
| 6,174,809 B1 | 1/2001 | Kang et al. |
| 6,203,613 B1 | 3/2001 | Gates et al. |
| 6,260,125 B1 | 7/2001 | McDowell |
| 6,270,572 B1 | 8/2001 | Kim et al. |
| 6,272,534 B1 | 8/2001 | Guha |
| 6,287,965 B1 | 9/2001 | Kang et al. |
| 6,467,023 B1 | 10/2002 | DeKoning et al. |
| 6,574,657 B1 | 6/2003 | Dickinson |
| 6,621,493 B1 | 9/2003 | Whitten |
| 6,804,676 B1 | 10/2004 | Bains, II |
| 6,947,981 B2 | 9/2005 | Lubbers et al. |
| 7,043,610 B2 | 5/2006 | Horn et al. |
| 7,051,126 B1 | 5/2006 | Franklin |
| 7,076,620 B2 | 7/2006 | Takeda et al. |
| 7,111,197 B2 | 9/2006 | Kingsbury et al. |
| 7,117,327 B2 | 10/2006 | Hirakawa et al. |
| 7,120,768 B2 | 10/2006 | Mizuno et al. |
| 7,130,975 B2 | 10/2006 | Suishu et al. |
| 7,139,927 B2 | 11/2006 | Park et al. |
| 7,159,088 B2 | 1/2007 | Hirakawa et al. |
| 7,167,963 B2 | 1/2007 | Hirakawa et al. |
| 7,203,741 B2 | 4/2007 | Marco et al. |
| 7,222,136 B1 | 5/2007 | Brown et al. |
| 7,296,008 B2 | 11/2007 | Passerini et al. |
| 7,328,373 B2 | 2/2008 | Kawamura et al. |
| 7,353,335 B2 | 4/2008 | Kawamura |
| 7,360,113 B2 | 4/2008 | Anderson et al. |
| 7,426,618 B2 | 9/2008 | Vu et al. |
| 7,519,625 B2 | 4/2009 | Honami et al. |
| 7,519,628 B1 | 4/2009 | Leverett |
| 7,546,485 B2 | 6/2009 | Cochran et al. |
| 7,590,887 B2 | 9/2009 | Kano |
| 7,606,940 B2 | 10/2009 | Yamagami |
| 7,719,443 B1 | 5/2010 | Natanzon |
| 7,757,057 B2 | 7/2010 | Sangapu et al. |
| 7,840,536 B1 | 11/2010 | Ahal et al. |
| 7,840,662 B1 | 11/2010 | Natanzon |
| 7,844,856 B1 | 11/2010 | Ahal et al. |
| 7,860,836 B1 | 12/2010 | Natanzon et al. |
| 7,882,286 B1 | 2/2011 | Natanzon et al. |
| 7,934,262 B1 | 4/2011 | Natanzon et al. |
| 7,958,372 B1 | 6/2011 | Natanzon |
| 8,037,162 B2 | 10/2011 | Marco et al. |
| 8,041,940 B1 | 10/2011 | Natanzon et al. |
| 8,060,713 B1 | 11/2011 | Natanzon |
| 8,060,714 B1 | 11/2011 | Natanzon |
| 8,103,937 B1 | 1/2012 | Natanzon et al. |
| 8,108,634 B1 | 1/2012 | Natanzon et al. |
| 8,205,009 B2 | 6/2012 | Heller et al. |
| 8,214,612 B1 | 7/2012 | Natanzon |
| 8,250,149 B2 | 8/2012 | Marco et al. |
| 8,271,441 B1 | 9/2012 | Natanzon et al. |
| 8,271,447 B1 | 9/2012 | Natanzon et al. |
| 8,332,687 B1 | 12/2012 | Natanzon et al. |
| 8,335,761 B1 | 12/2012 | Natanzon |
| 8,335,771 B1 | 12/2012 | Natanzon et al. |
| 8,341,115 B1 | 12/2012 | Natanzon et al. |
| 8,370,648 B1 | 2/2013 | Natanzon |
| 8,380,885 B1 | 2/2013 | Natanzon |
| 8,392,680 B1 | 3/2013 | Natanzon et al. |
| 8,429,362 B1 | 4/2013 | Natanzon et al. |
| 8,433,869 B1 | 4/2013 | Natanzon et al. |
| 8,438,135 B1 | 5/2013 | Natanzon et al. |
| 8,464,101 B1 | 6/2013 | Natanzon et al. |
| 8,478,955 B1 | 7/2013 | Natanzon et al. |
| 8,495,304 B1 | 7/2013 | Natanzon et al. |
| 8,510,279 B1 | 8/2013 | Natanzon et al. |
| 8,521,691 B1 | 8/2013 | Natanzon |
| 8,521,694 B1 | 8/2013 | Natanzon |
| 8,543,609 B1 | 9/2013 | Natanzon |
| 8,583,885 B1 | 11/2013 | Natanzon |
| 8,600,945 B1 | 12/2013 | Natanzon et al. |
| 8,601,085 B1 | 12/2013 | Ives et al. |
| 8,627,012 B1 | 1/2014 | Derbeko et al. |
| 8,683,592 B1 | 3/2014 | Dotan et al. |
| 8,694,700 B1 | 4/2014 | Natanzon et al. |
| 8,706,700 B1 | 4/2014 | Natanzon et al. |
| 8,712,962 B1 | 4/2014 | Natanzon et al. |
| 8,719,497 B1 | 5/2014 | Don et al. |
| 8,725,691 B1 | 5/2014 | Natanzon |
| 8,725,692 B1 | 5/2014 | Natanzon et al. |
| 8,726,066 B1 | 5/2014 | Natanzon et al. |
| 8,738,813 B1 | 5/2014 | Natanzon et al. |
| 8,745,004 B1 | 6/2014 | Natanzon et al. |
| 8,751,828 B1 | 6/2014 | Raizen et al. |
| 8,769,336 B1 | 7/2014 | Natanzon et al. |
| 8,805,786 B1 * | 8/2014 | Natanzon ............ G06F 11/2064 |
| | | 707/639 |
| 8,806,161 B1 | 8/2014 | Natanzon |
| 8,825,848 B1 | 9/2014 | Dotan et al. |
| 8,832,399 B1 | 9/2014 | Natanzon et al. |
| 8,850,143 B1 | 9/2014 | Natanzon |
| 8,850,144 B1 | 9/2014 | Natanzon et al. |
| 8,862,546 B1 | 10/2014 | Natanzon et al. |
| 8,892,835 B1 | 11/2014 | Natanzon et al. |
| 8,898,112 B1 | 11/2014 | Natanzon et al. |
| 8,898,409 B1 | 11/2014 | Natanzon et al. |
| 8,898,515 B1 | 11/2014 | Natanzon |
| 8,898,519 B1 | 11/2014 | Natanzon et al. |
| 8,914,595 B1 | 12/2014 | Natanzon |
| 8,924,668 B1 | 12/2014 | Natanzon |
| 8,930,500 B2 | 1/2015 | Marco et al. |
| 8,930,947 B1 | 1/2015 | Derbeko et al. |
| 8,935,498 B1 | 1/2015 | Natanzon |
| 8,949,180 B1 | 2/2015 | Natanzon et al. |
| 8,954,673 B1 | 2/2015 | Natanzon et al. |
| 8,954,796 B1 | 2/2015 | Cohen et al. |
| 8,959,054 B1 | 2/2015 | Natanzon |
| 8,977,593 B1 | 3/2015 | Natanzon et al. |
| 8,977,826 B1 | 3/2015 | Meiri et al. |
| 8,996,460 B1 | 3/2015 | Frank et al. |
| 8,996,461 B1 | 3/2015 | Natanzon et al. |
| 8,996,827 B1 | 3/2015 | Natanzon |
| 9,003,138 B1 | 4/2015 | Natanzon et al. |
| 9,026,696 B1 | 5/2015 | Natanzon et al. |
| 9,031,913 B1 | 5/2015 | Natanzon |
| 9,032,160 B1 | 5/2015 | Natanzon et al. |
| 9,037,818 B1 | 5/2015 | Natanzon et al. |
| 9,063,994 B1 | 6/2015 | Natanzon et al. |
| 9,069,479 B1 | 6/2015 | Natanzon |
| 9,069,709 B1 | 6/2015 | Natanzon et al. |
| 9,081,754 B1 | 7/2015 | Natanzon et al. |
| 9,081,842 B1 | 7/2015 | Natanzon et al. |
| 9,087,008 B1 | 7/2015 | Natanzon |
| 9,087,112 B1 | 7/2015 | Natanzon et al. |
| 9,104,529 B1 | 8/2015 | Derbeko et al. |
| 9,110,914 B1 | 8/2015 | Frank et al. |
| 9,116,811 B1 | 8/2015 | Derbeko et al. |
| 9,128,628 B1 | 9/2015 | Natanzon et al. |
| 9,128,855 B1 | 9/2015 | Natanzon et al. |
| 9,134,914 B1 | 9/2015 | Derbeko et al. |
| 9,135,119 B1 | 9/2015 | Natanzon et al. |
| 9,135,120 B1 | 9/2015 | Natanzon |
| 9,146,878 B1 | 9/2015 | Cohen et al. |
| 9,152,339 B1 | 10/2015 | Cohen et al. |
| 9,152,578 B1 | 10/2015 | Saad et al. |
| 9,152,814 B1 | 10/2015 | Natanzon |
| 9,158,578 B1 | 10/2015 | Derbeko et al. |
| 9,158,630 B1 | 10/2015 | Natanzon |
| 9,160,526 B1 | 10/2015 | Raizen et al. |
| 9,177,670 B1 | 11/2015 | Derbeko et al. |
| 9,189,339 B1 | 11/2015 | Cohen et al. |
| 9,189,341 B1 | 11/2015 | Natanzon et al. |
| 9,201,736 B1 | 12/2015 | Moore et al. |
| 9,223,659 B1 | 12/2015 | Natanzon et al. |
| 9,225,529 B1 | 12/2015 | Natanzon et al. |
| 9,235,481 B1 | 1/2016 | Natanzon et al. |
| 9,235,524 B1 | 1/2016 | Derbeko et al. |
| 9,235,632 B1 | 1/2016 | Natanzon |
| 9,244,997 B1 | 1/2016 | Natanzon et al. |
| 9,256,605 B1 | 2/2016 | Natanzon |
| 9,274,718 B1 | 3/2016 | Natanzon et al. |
| 9,275,063 B1 | 3/2016 | Natanzon |
| 9,286,052 B1 | 3/2016 | Solan et al. |

(56) References Cited

U.S. PATENT DOCUMENTS

| | | |
|---|---|---|
| 9,305,009 B1 | 4/2016 | Bono et al. |
| 9,323,750 B2 | 4/2016 | Natanzon et al. |
| 9,330,155 B1 | 5/2016 | Bono et al. |
| 9,336,094 B1 | 5/2016 | Wolfson et al. |
| 9,336,230 B1 | 5/2016 | Natanzon |
| 9,367,260 B1 | 6/2016 | Natanzon |
| 9,378,096 B1 | 6/2016 | Erel et al. |
| 9,378,219 B1 | 6/2016 | Bono et al. |
| 9,378,261 B1 | 6/2016 | Bono et al. |
| 9,383,937 B1 | 7/2016 | Frank et al. |
| 9,389,800 B1 | 7/2016 | Natanzon et al. |
| 9,405,481 B1 | 8/2016 | Cohen et al. |
| 9,405,684 B1 | 8/2016 | Derbeko et al. |
| 9,405,765 B1 | 8/2016 | Natanzon |
| 9,411,535 B1 | 8/2016 | Shemer et al. |
| 9,459,804 B1 | 10/2016 | Natanzon et al. |
| 9,460,028 B1 | 10/2016 | Raizen et al. |
| 9,471,579 B1 | 10/2016 | Natanzon |
| 9,477,407 B1 | 10/2016 | Marshak et al. |
| 9,501,542 B1 | 11/2016 | Natanzon |
| 9,507,732 B1 | 11/2016 | Natanzon et al. |
| 9,507,845 B1 | 11/2016 | Natanzon et al. |
| 9,514,138 B1 | 12/2016 | Natanzon et al. |
| 9,524,218 B1 | 12/2016 | Veprinsky et al. |
| 9,529,885 B1 | 12/2016 | Natanzon et al. |
| 9,535,800 B1 | 1/2017 | Natanzon et al. |
| 9,535,801 B1 | 1/2017 | Natanzon et al. |
| 9,547,459 B1 | 1/2017 | BenHanokh et al. |
| 9,547,591 B1 | 1/2017 | Natanzon et al. |
| 9,552,405 B1 | 1/2017 | Moore et al. |
| 9,557,921 B1 | 1/2017 | Cohen et al. |
| 9,557,925 B1 | 1/2017 | Natanzon |
| 9,563,517 B1 | 2/2017 | Natanzon et al. |
| 9,563,684 B1 | 2/2017 | Natanzon et al. |
| 9,575,851 B1 | 2/2017 | Natanzon et al. |
| 9,575,857 B1 | 2/2017 | Natanzon |
| 9,575,894 B1 | 2/2017 | Natanzon et al. |
| 9,582,382 B1 | 2/2017 | Natanzon et al. |
| 9,588,703 B1 | 3/2017 | Natanzon et al. |
| 9,588,847 B1 | 3/2017 | Natanzon et al. |
| 9,594,822 B1 | 3/2017 | Natanzon et al. |
| 9,600,377 B1 | 3/2017 | Cohen et al. |
| 9,619,543 B1 | 4/2017 | Natanzon et al. |
| 9,632,881 B1 | 4/2017 | Natanzon |
| 9,665,305 B1 | 5/2017 | Natanzon et al. |
| 9,710,177 B1 | 7/2017 | Natanzon |
| 9,720,618 B1 | 8/2017 | Panidis et al. |
| 9,722,788 B1 | 8/2017 | Natanzon et al. |
| 9,727,429 B1 | 8/2017 | Moore et al. |
| 9,733,969 B2 | 8/2017 | Derbeko et al. |
| 9,737,111 B2 | 8/2017 | Lustik |
| 9,740,572 B1 * | 8/2017 | Natanzon ............ G06F 11/1464 |
| 9,740,573 B1 | 8/2017 | Natanzon |
| 9,740,880 B1 | 8/2017 | Natanzon et al. |
| 9,749,300 B1 | 8/2017 | Cale et al. |
| 9,772,789 B1 | 9/2017 | Natanzon et al. |
| 9,798,472 B1 | 10/2017 | Natanzon et al. |
| 9,798,490 B1 | 10/2017 | Natanzon |
| 9,804,934 B1 | 10/2017 | Natanzon et al. |
| 9,811,431 B1 | 11/2017 | Natanzon et al. |
| 9,823,865 B1 | 11/2017 | Natanzon et al. |
| 9,823,973 B1 | 11/2017 | Natanzon |
| 9,832,261 B2 | 11/2017 | Don et al. |
| 9,846,698 B1 | 12/2017 | Panidis et al. |
| 2002/0129168 A1 | 9/2002 | Kanai et al. |
| 2003/0048842 A1 | 3/2003 | Fourquin et al. |
| 2003/0061537 A1 | 3/2003 | Cha et al. |
| 2003/0110278 A1 | 6/2003 | Anderson |
| 2003/0145317 A1 | 7/2003 | Chamberlain |
| 2003/0196147 A1 | 10/2003 | Hirata et al. |
| 2004/0205092 A1 | 10/2004 | Longo et al. |
| 2004/0250032 A1 | 12/2004 | Ji et al. |
| 2004/0254964 A1 | 12/2004 | Kodama et al. |
| 2005/0015663 A1 | 1/2005 | Armangau et al. |
| 2005/0028022 A1 | 2/2005 | Amano |
| 2005/0049924 A1 | 3/2005 | DeBettencourt et al. |
| 2005/0172092 A1 * | 8/2005 | Lam .................... G06F 11/1451 711/161 |
| 2005/0273655 A1 | 12/2005 | Chow et al. |
| 2006/0031647 A1 | 2/2006 | Hirakawa et al. |
| 2006/0047996 A1 | 3/2006 | Anderson et al. |
| 2006/0064416 A1 | 3/2006 | Sim-Tang |
| 2006/0107007 A1 | 5/2006 | Hirakawa et al. |
| 2006/0117211 A1 | 6/2006 | Matsunami et al. |
| 2006/0161810 A1 | 7/2006 | Bao |
| 2006/0179343 A1 | 8/2006 | Kitamura |
| 2006/0195670 A1 | 8/2006 | Iwamura et al. |
| 2007/0055833 A1 | 3/2007 | Vu et al. |
| 2007/0180304 A1 | 8/2007 | Kano |
| 2007/0198602 A1 | 8/2007 | Ngo et al. |
| 2007/0198791 A1 | 8/2007 | Iwamura et al. |
| 2015/0310044 A1 * | 10/2015 | Isaacson ........... G06F 17/30566 707/613 |
| 2016/0320986 A1 * | 11/2016 | Bonwick ............... G06F 3/0619 |
| 2017/0249222 A1 * | 8/2017 | Patnaik ................. G06F 3/0619 |

OTHER PUBLICATIONS

U.S. Appl. No. 15/274,117, filed Sep. 23, 2016, Baruch.
U.S. Appl. No. 15/274,373, filed Sep. 23, 2016, Baruch et al.
U.S. Appl. No. 15/274,129, filed Sep. 23, 2016, Baruch et al.
U.S. Appl. No. 15/274,381, filed Sep. 23, 2016, Ayzenberg et al.
U.S. Appl. No. 15/275,677, filed Sep. 23, 2016, Baruch et al.
Gibson, "Five Point Plan Lies at the Heart of Compression Technology;" Tech Talk; Apr. 29, 1991; 1 Page.
Soules et al., "Metadata Efficiency in Versioning File Systems;"$2^{nd}$ USENIX Conference on File and Storage Technologies; Mar. 31, 2003-Apr. 2, 2003; 16 Pages.
AIX System Management Concepts: Operating Systems and Devices; Bull Electronics Angers; May 2000; 280 Pages.
Soules et al., "Metadata Efficiency in a Comprehensive Versioning File System;" May 2002; CMU-CS-02-145; School of Computer Science, Carnegie Mellon University; 33 Pages.
"Linux Filesystems," Sams Publishing; 2002; Chapter 1: Introduction to Filesystems pp. 17-22 and Chapter 3: Overview of Journaling Filesystems pp. 67-71; 12 Pages.
Bunyan et al., "Multiplexing in a BrightStor® ARCserve® Backup Release 11;" Mar. 2004; 4 Pages.
Marks, "Network Computing, 33;" Cover Story; Feb. 2, 2006; 8 Pages.
Hill, "Network Computing, NA;" Cover Story; Jun. 8, 2006; 9 Pages.
Microsoft Computer Dictionary, Fifth Edition; 2002; 3 Pages.
Wikipedia; Retrieved on Mar. 29, 2011 from http://en.wikipedia.org/wiki/DEFLATE: DEFLATE; 6 Pages.
Wikipedia; Retrieved on Mar. 29, 2011 from http://en.wikipedia.org/wiki/Huffman_coding: HUFFMAN CODING;11 Pages.
Wikipedia; Retrieved on Mar. 29, 2011 from http:///en.wikipedia.org/wiki/LZ77: LZ77 and LZ78; 2 Pages.

* cited by examiner

US 10,019,194 B1

EVENTUALLY CONSISTENT SYNCHRONOUS DATA REPLICATION IN A STORAGE SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. A distributed storage system may include data protection systems that back up production site data by replicating production site data on a secondary backup storage system. The production site data may be replicated on a periodic basis and/or may be replicated as changes are made to the production site data. The backup storage system may be situated in the same physical location as the production storage system, or in a physically remote location.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

One aspect provides a method of operating a storage system. One or more production volumes of the storage system are selected for continuous replication. A number, N, is selected that is associated with a number of damaged volumes the storage system can sustain and maintain data consistency. Write transactions from a host to an associated one of the selected one or more production volumes are intercepted. The intercepted write transactions are sent to the associated production volume and to a plurality of copy volumes. When acknowledgments of the write transaction have been received from N copy volumes, the write transaction is acknowledged to the host.

Another aspect provides a system that includes a processor and memory storing computer program code that when executed on the processor causes the processor to operate a storage system. The storage system is operable to perform the operations of selecting one or more production volumes of the storage system for continuous replication. A number, N, is selected that is associated with a number of damaged volumes the storage system can sustain and maintain data consistency. Write transactions from a host to an associated one of the selected one or more production volumes are intercepted. The intercepted write transactions are sent to the associated production volume and to a plurality of copy volumes. When acknowledgments of the write transaction have been received from N copy volumes, the write transaction is acknowledged to the host.

Another aspect provides a computer program product including a non-transitory computer readable storage medium having computer program code encoded thereon that when executed on a processor of a computer causes the computer to operate a storage system. The computer program product includes computer program code for selecting one or more production volumes of the storage system for continuous replication. A number, N, is selected that is associated with a number of damaged volumes the storage system can sustain and maintain data consistency. Write transactions from a host to an associated one of the selected one or more production volumes are intercepted. The intercepted write transactions are sent to the associated production volume and to a plurality of copy volumes. When acknowledgments of the write transaction have been received from N copy volumes, the write transaction is acknowledged to the host.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or data write request. In some embodiments, the term "storage system" may encompass physical computing systems, cloud or virtual computing systems, or a combination thereof. In some embodiments, the term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). In some embodiments, the term "storage device" may also refer to a storage array including multiple storage devices.

Figure 1:
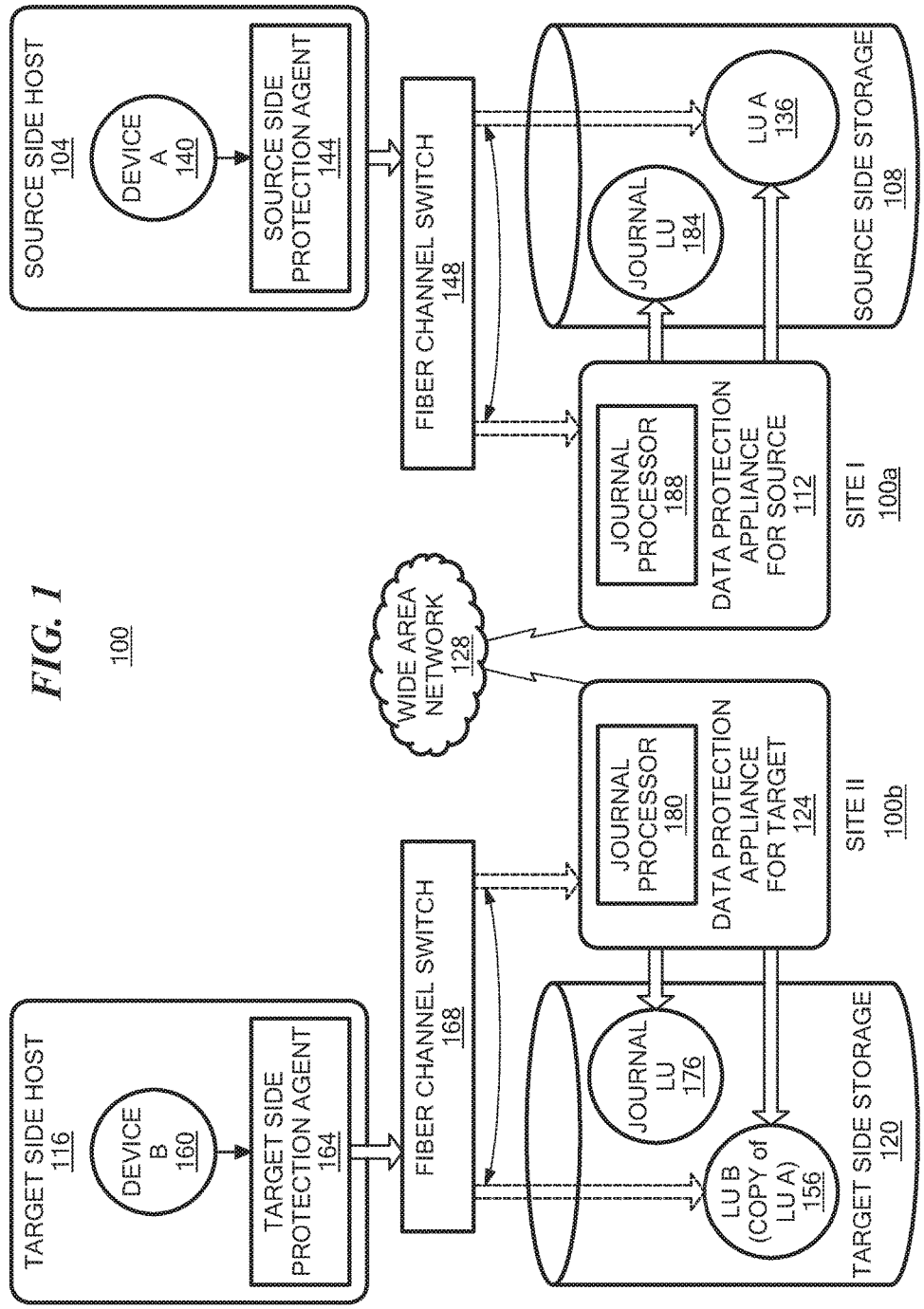
FIG. 1 is a block diagram of a data protection system, according to an illustrative embodiment of the instant disclosure.

Referring to the example embodiment shown in FIG. 1, a data protection system 100 may include two sites, Site I 100a and Site II 100b, which communicate via a wide area network (WAN) 128, such as the Internet. In some embodiments, under normal operation, Site I 100*a* may correspond to a source site (i.e., the transmitter within a data replication workflow) of system 100 and Site II 100*b* may be a target site (i.e., the receiver within a data replication workflow) of data protection system 100. Thus, in some embodiments, during normal operations, the direction of replicated data flow may be from Site I 100*a* to Site II 100*b*.

In certain embodiments, Site I 100*a* and Site II 100*b* may be remote from one another. In other embodiments, Site I 100*a* and Site II 100*b* may be local to one another and may be connected via a local area network (LAN). In some embodiments, local data protection may have the advantage of minimizing data lag between target and source, and remote data protection may have the advantage of being robust in the event that a disaster occurs at the source site.

In particular embodiments, data protection system 100 may include a failover mode of operation, wherein the direction of replicated data flow is reversed. In particular, in some embodiments, Site I 100*a* may behave as a target site and Site II 100*b* may behave as a source site. In some embodiments, failover may be triggered manually (e.g., by a user) or automatically. In many embodiments, failover may be performed in the event of a disaster at Site I 100*a*. In some embodiments, both Site I 100*a* and Site II 100*b* may behave as source site for some stored data and may behave simultaneously as a target site for other stored data. In certain embodiments, a portion of stored data may be replicated from one site to the other, and another portion may not be replicated.

In some embodiments, Site I 100*a* corresponds to a production site (e.g., a facility where one or more hosts run data processing applications that write data to a storage system and read data from the storage system) and Site II 100*b* corresponds to a backup or replica site (e.g., a facility where replicated production site data is stored). Thus, in some embodiments, Site II 100*b* may be responsible for replicating production site data and may enable rollback of data of Site I 100*a* to an earlier point in time. In some embodiments, rollback may be used in the event of data corruption of a disaster, or alternatively in order to view or to access data from an earlier point in time.

Described embodiments of Site I 100*a* may include a source host 104, a source storage system (or "storage array") 108, and a source data protection appliance (DPA) 112 coupled via a first storage area network (SAN). Similarly, in some embodiments, Site II 100*b* may include a target host 116, a target storage system 120, and a target DPA 124 coupled via a second SAN. In some embodiments, each SAN may include one or more devices (or "nodes") that may be designated an "initiator," a "target", or both. For example, in some embodiments, the first SAN may include a first fiber channel switch 148 and the second SAN may include a second fiber channel switch 168. In some embodiments, communication links between each host 104 and 116 and its corresponding storage system 108 and 120 may be any appropriate medium suitable for data transfer, such as fiber communication channel links. In many embodiments, a host communicates with its corresponding storage system over a communication link, such as an InfiniBand (IB) link or Fibre Channel (FC) link, and/or a network, such as an Ethernet or Internet (e.g., TCP/IP) network that may employ, for example, the iSCSI protocol.

In some embodiments, each storage system 108 and 120 may include storage devices for storing data, such as disks or arrays of disks. Typically, in such embodiments, storage systems 108 and 120 may be target nodes. In some embodiments, in order to enable initiators to send requests to storage system 108, storage system 108 may provide (e.g., expose) one or more logical units (LU) to which commands are issued. Thus, in some embodiments, storage systems 108 and 120 may be SAN entities that provide multiple logical units for access by multiple SAN initiators. In some embodiments, an LU is a logical entity provided by a storage system for accessing data stored therein. In some embodiments, a logical unit may be a physical logical unit or a virtual logical unit. In some embodiments, a logical unit may be identified by a unique logical unit number (LUN).

In the embodiment shown in FIG. 1, storage system 108 may expose logical unit 136, designated as LU A, and storage system 120 exposes logical unit 156, designated as LU B. LU B 156 may be used for replicating LU A 136. In such embodiments, LU B 156 may be generated as a copy of LU A 136. In one embodiment, LU B 156 may be configured so that its size is identical to the size of LU A 136.

As shown in FIG. 1, in some embodiments, source host 104 may generate a host device 140 ("Device A") corresponding to LU A 136 and source host 116 may generate a host device 160 ("Device B") corresponding to LU B 156. In some embodiments, a host device may be a logical entity within a host through which the host may access an LU. In some embodiments, an operating system of a host may generate a host device for each LU exposed by the storage system in the host SAN.

In some embodiments, source host 104 may act as a SAN initiator that issues I/O requests through host device 140 to LU A 136 using, for example, SCSI commands. In some embodiments, such requests may be transmitted to LU A 136 with an address that includes a specific device identifier, an offset within the device, and a data size.

In some embodiments, source DPA 112 and target DPA 124 may perform various data protection services, such as data replication of a storage system, and journaling of I/O requests issued by hosts 104 and/or 116. In some embodiments, when acting as a target DPA, a DPA may also enable rollback of data to an earlier point-in-time (PIT), and enable processing of rolled back data at the target site. In some embodiments, each DPA 112 and 124 may be a physical device, a virtual device, or may be a combination of a virtual and physical device.

In some embodiments, a DPA may be a cluster of such computers. In some embodiments, use of a cluster may ensure that if a DPA computer is down, then the DPA functionality switches over to another computer. In some embodiments, the DPA computers within a DPA cluster may communicate with one another using at least one communication link suitable for data transfer, for example, an InfiniBand (TB) link, a Fibre Channel (FC) link, and/or a network link, such as an Ethernet or Internet (e.g., TCP/IP) link to transfer data via fiber channel or IP based protocols, or other such transfer protocols. In some embodiments, one computer from the DPA cluster may serve as the DPA leader. In some embodiments, the DPA cluster leader may coordinate between the computers in the cluster, and may also perform other tasks that require coordination between the computers, such as load balancing.

In certain embodiments, a DPA may be a standalone device integrated within a SAN. Alternatively, in some embodiments, a DPA may be integrated into storage system. In some embodiments, the DPAs communicate with their respective hosts through communication links suitable for data transfer, for example, an InfiniBand (TB) link, a Fibre Channel (FC) link, and/or a network link, such as an Ethernet or Internet (e.g., TCP/IP) link to transfer data via, for example, SCSI commands or any other protocol.

In various embodiments, the DPAs may act as initiators in the SAN. For example, in some embodiments, the DPAs may issue I/O requests using, for example, SCSI commands, to access LUs on their respective storage systems. In some embodiments, each DPA may also be configured with the necessary functionality to act as targets, e.g., to reply to I/O requests, such as SCSI commands, issued by other initiators in the SAN, including their respective hosts. In some embodiments, being target nodes, the DPAs may dynamically expose or remove one or more LUs. As described herein, in some embodiments, Site I 100a and Site II 100b may each behave simultaneously as a production site and a backup site for different logical units. As such, in some embodiments, DPA 112 and DPA 124 may each behave as a source DPA for some LUs and as a target DPA for other LUs, at the same time.

In the example embodiment shown in FIG. 1, hosts 104 and 116 include protection agents 144 and 164, respectively. In some embodiments, protection agents 144 and 164 may be intercept commands (e.g., SCSI commands) issued by their respective hosts to LUs via host devices (e.g., host devices 140 and 160). In some embodiments, a protection agent may act on intercepted SCSI commands issued to a logical unit in one of the following ways: send the SCSI commands to its intended LU; redirect the SCSI command to another LU; split the SCSI command by sending it first to the respective DPA and, after the DPA returns an acknowledgement, send the SCSI command to its intended LU; fail a SCSI command by returning an error return code; and delay a SCSI command by not returning an acknowledgement to the respective host. In some embodiments, protection agents 144 and 164 may handle different SCSI commands, differently, according to the type of the command. For example, in some embodiments, a SCSI command inquiring about the size of a certain LU may be sent directly to that LU, whereas a SCSI write command may be split and sent first to a DPA within the host's site.

In various embodiments, a protection agent may change its behavior for handling SCSI commands, for example as a result of an instruction received from the DPA. For example, in some embodiments, the behavior of a protection agent for a certain host device may depend on the behavior of its associated DPA with respect to the LU of the host device. In some embodiments, when a DPA behaves as a source site DPA for a certain LU, then during normal course of operation, the associated protection agent may split I/O requests issued by a host to the host device corresponding to that LU. Similarly, in some embodiments, when a DPA behaves as a target device for a certain LU, then during normal course of operation, the associated protection agent fails I/O requests issued by host to the host device corresponding to that LU.

In some embodiments, communication between protection agents 144 and 164 and a respective DPA 112 and 124 may use any protocol suitable for data transfer within a SAN, such as fiber channel, SCSI over fiber channel, or other protocols. In some embodiments, the communication may be direct, or via a logical unit exposed by the DPA.

In certain embodiments, protection agents may be drivers located in their respective hosts. Alternatively, in some embodiments, a protection agent may also be located in a fiber channel switch, or in any other device situated in a data path between a host and a storage system or on the storage system itself. In some embodiments, in a virtualized environment, the protection agent may run at the hypervisor layer or in a virtual machine providing a virtualization layer.

Figure 2:
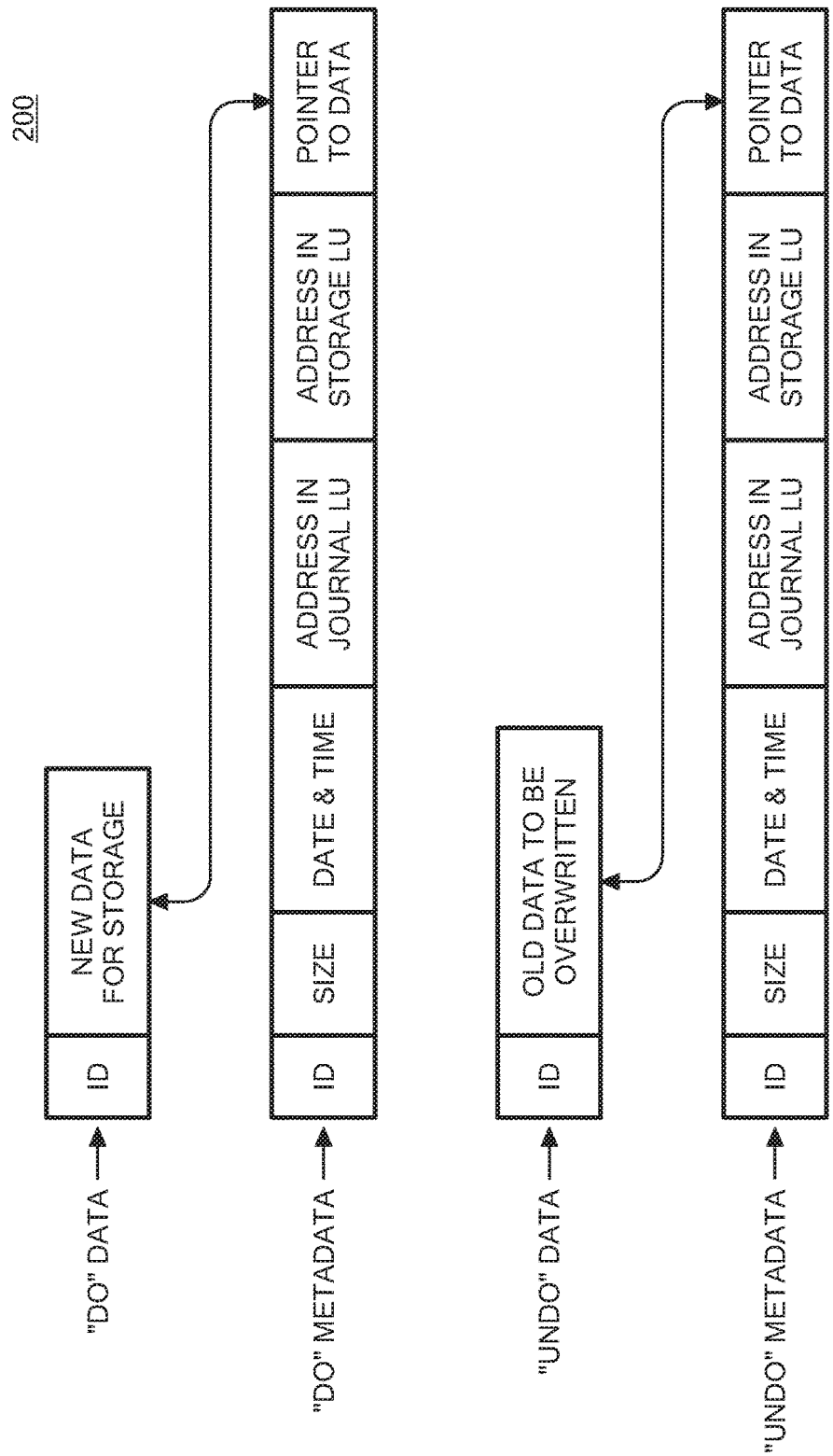
FIG. 2 is a diagram illustrating a journal history of write transactions for the data protection system of FIG. 1, according to an illustrative embodiment of the instant disclosure.

As shown in the example embodiment shown in FIG. 1, target storage system 120 may expose a journal LU 176 for maintaining a history of write transactions made to LU B 156, referred to herein as a "journal." In some embodiments, a journal may be used to provide access to storage at specified points-in-time (PITs), as discussed in greater detail in regard to FIG. 2. In some embodiments, the journal may be stored across multiple LUs (e.g., using striping, etc.). In some embodiments, target DPA 124 may include a journal processor 180 for managing the journal within journal LU 176. Referring back to the example embodiment of FIG. 1, journal processor 180 may manage the journal entries of LU B 156. Specifically, in some embodiments, journal processor 180 may enter write transactions received by the target DPA 124 from the source DPA 112 into the journal by writing them into journal LU 176, read the undo information for the transaction from LU B 156, update the journal entries in journal LU 176 with undo information, apply the journal transactions to LU B 156, and remove already-applied transactions from the journal. In one embodiment, journal processor 180 may perform processing such as described in the patent titled "METHODS AND APPARATUS FOR OPTIMAL JOURNALING FOR CONTINUOUS DATA REPLICATION" and with U.S. Pat. No. 7,516,287, issued Apr. 7, 2009, which is hereby incorporated by reference.

Some embodiments of data protection system 100 may be provided as physical systems for the replication of physical LUs, or as virtual systems for the replication of virtual LUs. For example, in one embodiment, a hypervisor may consume LUs and may generate a distributed file system on the logical units such as Virtual Machine File System (VMFS) that may generate files in the file system and expose the files as LUs to the virtual machines (each virtual machine disk is seen as a SCSI device by virtual hosts). In another embodiment, a hypervisor may consume a network based file system and exposes files in the Network File System (NFS) as SCSI devices to virtual hosts.

In some embodiments, in normal operation (sometimes referred to as "production mode"), DPA 112 may act as a source DPA for LU A 136. Thus, in some embodiments, protection agent 144 may act as a source protection agent, specifically by splitting I/O requests to host device 140 ("Device A"). In some embodiments, protection agent 144 may send an I/O request to source DPA 112 and, after receiving an acknowledgement from source DPA 112, may send the I/O request to LU A 136. In some embodiments, after receiving an acknowledgement from storage system 108, host 104 may acknowledge that the I/O request has successfully completed.

In some embodiments, when source DPA 112 receives a replicated I/O request from protection agent 144, source DPA 112 may transmit certain I/O information characterizing the write request, packaged as a "write transaction", over WAN 128 to target DPA 124 for journaling and for incorporation within target storage system 120. In some embodiments, when applying write operations to storage system 120, target DPA 124 may act as an initiator, and may send SCSI commands to LU B 156.

In some embodiments, source DPA 112 may send its write transactions to target DPA 124 using a variety of modes of transmission, including (i) a synchronous mode, (ii) an asynchronous mode, and (iii) a snapshot mode.

In some embodiments, in synchronous (or continuous) mode, source DPA 112 may send each write transaction to target DPA 124, may receive back an acknowledgement from the target DPA 124, and in turn may send an acknowledgement back to protection agent 144. In some embodiments, in synchronous mode, protection agent 144 may wait until receipt of such acknowledgement before sending the I/O request to LU 136.

Thus, as described herein, in some embodiments, in continuous mode, every write I/O to a production volume may be intercepted and sent to both the production volume and a replica volume. Thus, in some embodiments, continuous mode may provide a very low Recovery Point Objective (RPO), meaning that data on a replica volume lags data on the production volume by only a short time period (e.g., a few seconds). In some embodiments, RPO is an amount of data that the user is willing to lose in case of production disaster (e.g., an amount of time between replications). In some embodiments (e.g., for particularly important data), continuous mode may provide an RPO of zero (e.g., data on the replica volume is the same as data on the production volume) and high granularity of points in time (PITs) for restoring the production volume (e.g., since continuous replication may generate a replica each time there is a write operation to the production volume).

In some embodiments, in asynchronous mode, source DPA 112 may send an acknowledgement to protection agent 144 upon receipt of each I/O request, before receiving an acknowledgement back from target DPA 124.

In some embodiments, in snapshot mode, source DPA 112 may receive several I/O requests and combine them into an aggregate "snapshot" or "batch" of write activity performed in the multiple I/O requests, and may send the snapshot to target DPA 124 for journaling and incorporation in target storage system 120. In some embodiments, in snapshot mode, source DPA 112 may send an acknowledgement to protection agent 144 upon receipt of each I/O request, before receiving an acknowledgement back from target DPA 124.

Thus, in some embodiments, in snapshot mode, snapshot replicas of a production volume may be periodically generated, and changes in data may be tracked between consecutive snapshot replicas. For example, one or more write operations may modify data on the production volume between generation of snapshot replicas. In some embodiments, regions of the production volume that are modified, and the changed data written to the regions, may be tracked. In some embodiments, when a new snapshot replica is generated, modified regions may be read from the production volume and sent to the replica volume.

In some embodiments, a snapshot replica may be a differential representation of a volume. For example, the snapshot may include pointers to the original volume, and may point to log volumes for locations of the original volume that store data changed by one or more I/O requests. In some embodiments, snapshots may be combined into a snapshot array, which may represent different images over a time period (e.g., for multiple PITs).

In some embodiments, in normal operation, LU B 156 may be used as a backup of LU A 136. In such embodiments, while data written to LU A 136 by host 104 is replicated from LU A 136 to LU B 156, target host 116 should not send I/O requests to LU B 156. To prevent such I/O requests from being sent, in some embodiments, protection agent 164 may act as a target site protection agent for host device B 160 and may fail I/O requests sent from host 116 to LU B 156 through host device B 160. In some embodiments, in a recovery mode, target DPA 124 may undo the write transactions in journal LU 176 so as to restore the target storage system 120 to an earlier state.

Referring to FIG. 2, in some described embodiments, a write transaction 200 may be included within a journal and stored within a journal LU. In some embodiments, write transaction 200 may include one or more identifiers; a time stamp indicating the date and time at which the transaction was received by the source DPA; a write size indicating the size of the data block; a location in the journal LU where the data is entered; a location in the target LU where the data is to be written; and the data itself.

Referring to both FIGS. 1 and 2, in some embodiments, transaction 200 may correspond to a transaction transmitted from source DPA 112 to target DPA 124. In some embodiments, target DPA 124 may record write transaction 200 in the journal that includes four streams. In some embodiments, a first stream, referred to as a "DO" stream, includes a copy of the new data for writing to LU B 156. In some embodiments, a second stream, referred to as a "DO METADATA" stream, includes metadata for the write transaction, such as an identifier, a date and time, a write size, the offset within LU B 156 where the new data is written, and a pointer to the offset in the DO stream where the corresponding data is located. In some embodiments, a third stream, referred to as an "UNDO" stream, includes a copy of the data being overwritten within LU B 156 (referred to herein as the "old" data). In some embodiments, a fourth stream, referred to as an "UNDO METADATA" stream, includes an identifier, a date and time, a write size, a beginning address in LU B 156 where data was (or will be) overwritten, and a pointer to the offset in the UNDO stream where the corresponding old data is located.

Since the journal contains the "undo" information necessary to rollback storage system 120, in some embodiments, data that was stored in specific memory locations at a specified point in time may be obtained by undoing write transactions that occurred subsequent to such point in time (PIT).

In some embodiments, each of the four streams may hold a plurality of write transaction data. In some embodiments, as write transactions are received dynamically by the target DPA, the write transactions may be recorded at the end of the DO stream and the end of the DO METADATA stream, prior to committing the transaction.

In some embodiments, a metadata stream (e.g., UNDO METADATA stream or the DO METADATA stream) and the corresponding data stream (e.g., UNDO stream or DO stream) may be kept in a single stream by interleaving metadata and data.

Some described embodiments may validate that point-in-time (PIT) data replicas (e.g., data replicated to LU B 156) are valid and usable, for example to verify that the data replicas are not corrupt due to a system error or inconsistent due to violation of write order fidelity. In some embodiments, validating data replicas can be important, for example, in data replication systems employing incremental backup where an undetected error in an earlier data replica may lead to corruption of future data replicas.

In conventional systems, validating data replicas can increase the journal lag, which may increase a recovery time objective (RTO) of a data protection system (e.g., an elapsed time between replicas or PITs). In such conventional systems, if the journal lag time is significant, the journal may become full and unable to account for data changes due to subsequent transactions. Further, in such conventional systems, validating data replicas may consume system resources (e.g., processor time, memory, communication link bandwidth, etc.), resulting in reduced performance for system tasks.

Figure 3:
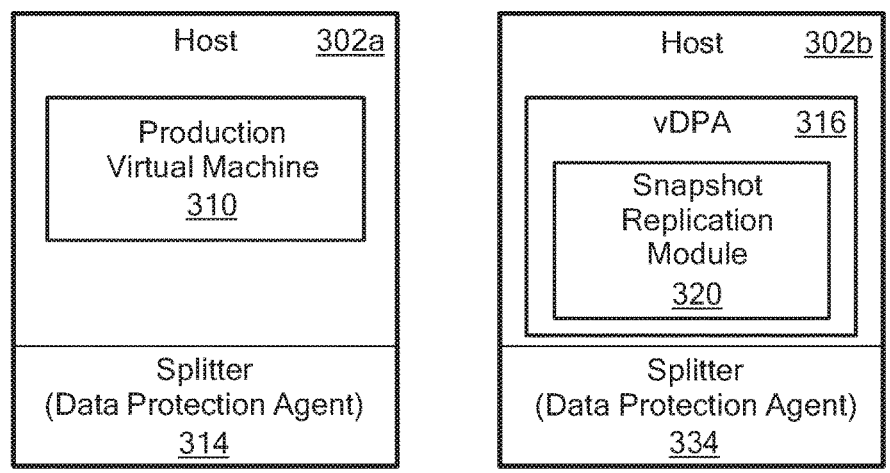
FIG. 3 is a block diagram of an example of a data protection system to perform snapshot replication, according to an illustrative embodiment of the instant disclosure.
Figure 3:
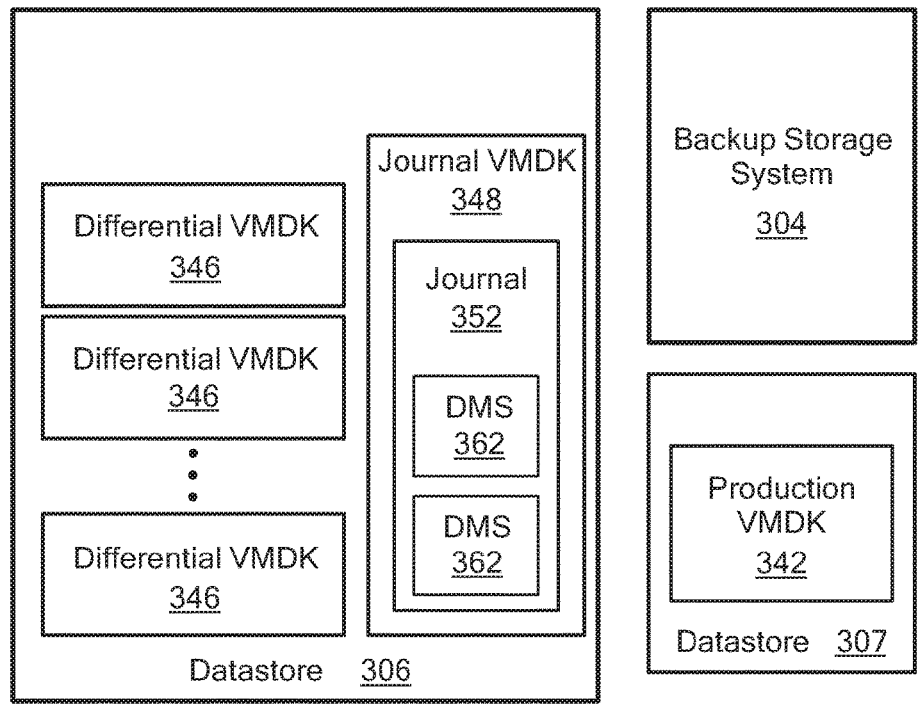

Referring to FIG. 3, in an illustrative embodiment, a data protection system 300 may include host 302*a*, host 302*b*, backup storage system 304 (e.g., a deduplicated storage system) and a datastore 306. In some embodiments, host 302a may include production virtual machine 310 and splitter 314 (e.g., data protection agent 144 of FIG. 1). In some embodiments, host 302b may be a hypervisor and splitter 314 may operate either in the hypervisor kernel or in another layer in the hypervisor, which allows splitter 314 to intercept I/O requests sent from host 302a to one or more virtual machine disks (VMDKs) 342. In some embodiments, host 302b may include a virtual data protection appliance (e.g., DPA appliance 124 of FIG. 1) having snapshot replication module 320 and splitter 334 (e.g., data protection agent 164 of FIG. 1). In an embodiment, splitter 334 of host 302b enables protection of virtual machines on the host 302b. In some embodiments, splitter 334 of host 302b may also provide faster access to VMDKs 342 from virtual DPA (vDPA) 316.

In an embodiment, datastore 306 may include one or more differential virtual machine disks, shown as differential VMDKs 346. Some embodiments of datastore 306 may also include journal virtual machine disk 348. In some embodiments, differential VMDKs 346 and journal VMDK 348 may be stored in datastore 306, and one or more production virtual machine disks 342 may be stored in datastore 307. In some embodiments, datastore 306 and datastore 307 are separate physical devices so that access to differential VMDKs does not affect performance of production VMDKs. In some embodiments, differential VMDKs 346 may be used to store differential snapshot data representative of changes that happened to data stored on production VMDK 342. In one example, a first differential VMDK 346 may include changes due to writes that occurred to production VMDK 342 from time t1 to time t2, a second differential VMDK 346 may include the changes due to writes that occurred to production VMDK 342 from time t2 to time t3, and so forth.

In some embodiments, differential VMDKs 346 may be thin provisioned. Thin provisioning allocates storage space to volumes of a SAN in a flexible manner among multiple volumes based on a minimum space requirement for each volume at any given time.

In some embodiments, journal 352 may be stored in journal VMDK 348. Journal 352 includes one or more delta marker streams (DMS) 362. In some embodiments, each DMS 362 may include metadata associated with data that may be different between one differential VMDK and another differential VMDK.

In one example, DMS 362 may include the metadata differences between a current copy of the production VMDK 342 and a copy currently stored in backup storage 304. In some embodiments, journal 352 does not include the actual data changes, but rather metadata associated with the changes. In some embodiments, the data of the changes may be stored in the differential VMDKs.

Although not shown in FIG. 3, in some embodiments, host 302b, datastore 306 and backup storage system 304 may be integrated into a single device, such as an integrated protection appliance to backup and protect production data.

In some embodiments, data protection system may include one or more consistency groups. In some embodiments, a consistency group may treat source volumes (e.g., production volumes) and target volumes (e.g., backup volumes) as a single logical entity for data replication and migration.

Embodiments employing synchronous (or continuous) replication may provide zero data loss (e.g., a zero RPO) in case of a failed or damaged production volume. In some embodiments, since, in synchronous replication, data is sent to the replica "inline" (e.g., as part of the write transaction), data is not read from the production volume to generate a replica. However, since, in some embodiments, every write transaction sent to the production volume is also sent to the replica volume, network bandwidth requirements of continuous replication can be high (e.g., as high as the bandwidth of peak writes to the production volume). Further, since, in some embodiments, write transactions are sent to both the production and replica volumes, system performance can be lessened because each write transaction needs to be received by the replica volume(s) before the write transaction can be acknowledged.

Illustrative multi-copy data replication systems may commonly (but not always) be active-passive systems having one active production volume and one or more passive replica volumes. In illustrative active-passive systems, links between the production volume and each replica volume are configured independently (e.g., per link) as either synchronous or asynchronous. In such systems, if the link is synchronous then the replica volume is always consistent with the latest state of the production volume (for example, synchronous or continuous replication). In such systems, if the link is asynchronous, the replica volume eventually becomes consistent with the production volume (for example asynchronous or snapshot replication).

Some embodiments of data protection system 100 may be "active-active" systems having multiple nodes (e.g., multiple production sites and multiple target sites). Illustrative active-active systems may allow concurrent access to both a production site and a target site, for example as in a distributed database. In such active-active systems, a read-write quorum may be employed when all nodes need to be consistent (e.g., have synchronized data) with zero data loss (e.g., zero RPO). For example, in a conventional active-active system having a large number of nodes and/or employing database sharding (e.g., partitioning) across multiple nodes, each write transaction may need to reach at least a subset of the nodes before the write transaction is acknowledged. Thus, in conventional active-active systems, at least some of the copy nodes are defined as synchronous copies.

Some described embodiments provide multi-copy data replication having a zero RPO without defining any of the copies as a synchronous copy. As will be described, in some embodiments, each write transaction for a production volume may be intercepted (e.g., by protection agent 144 of FIG. 1) and sent to every copy volume. In some embodiments, when a first one of the copy volumes acknowledges the write transaction, the write transaction may be acknowledged as complete to the protection agent (e.g., instead of waiting for all the copy volumes to acknowledge the write transaction). Some embodiments may provide for zero data loss (e.g., zero RPO) in the case of damage to N copy volumes (including the production volume), where N is less than or equal to the total number of volumes. For example, when a first N ones of the copy volumes acknowledge the write transaction, the write transaction may be acknowledged as complete to the protection agent (e.g., instead of waiting for all the copy volumes to acknowledge the write transaction).

In some embodiments, acknowledgements of the write transaction from remaining copy volumes may be received while the data protection system is performing subsequent transactions. Thus, in some embodiments, performance of data protection system 100 can be improved when requiring synchronous (or continuous) replication by decreasing an elapsed time to perform write transactions (e.g., by not waiting for all copy volumes to acknowledge a write transaction before performing subsequent transactions). Thus, in some described embodiments, synchronous replication could be performed to multiple cloud (e.g., virtual) copy volumes without waiting for all the cloud copy volumes to acknowledge each write transaction. This may increase system performance of such embodiments since response time of cloud copy volumes could vary between each cloud copy volume (e.g., depending on location, performance of networks specific to each cloud volume, etc.). Further, some described embodiments do not rely upon a single cloud copy volume to store data copies, which may improve system robustness and improve average response time by having multiple copies.

Figure 4:
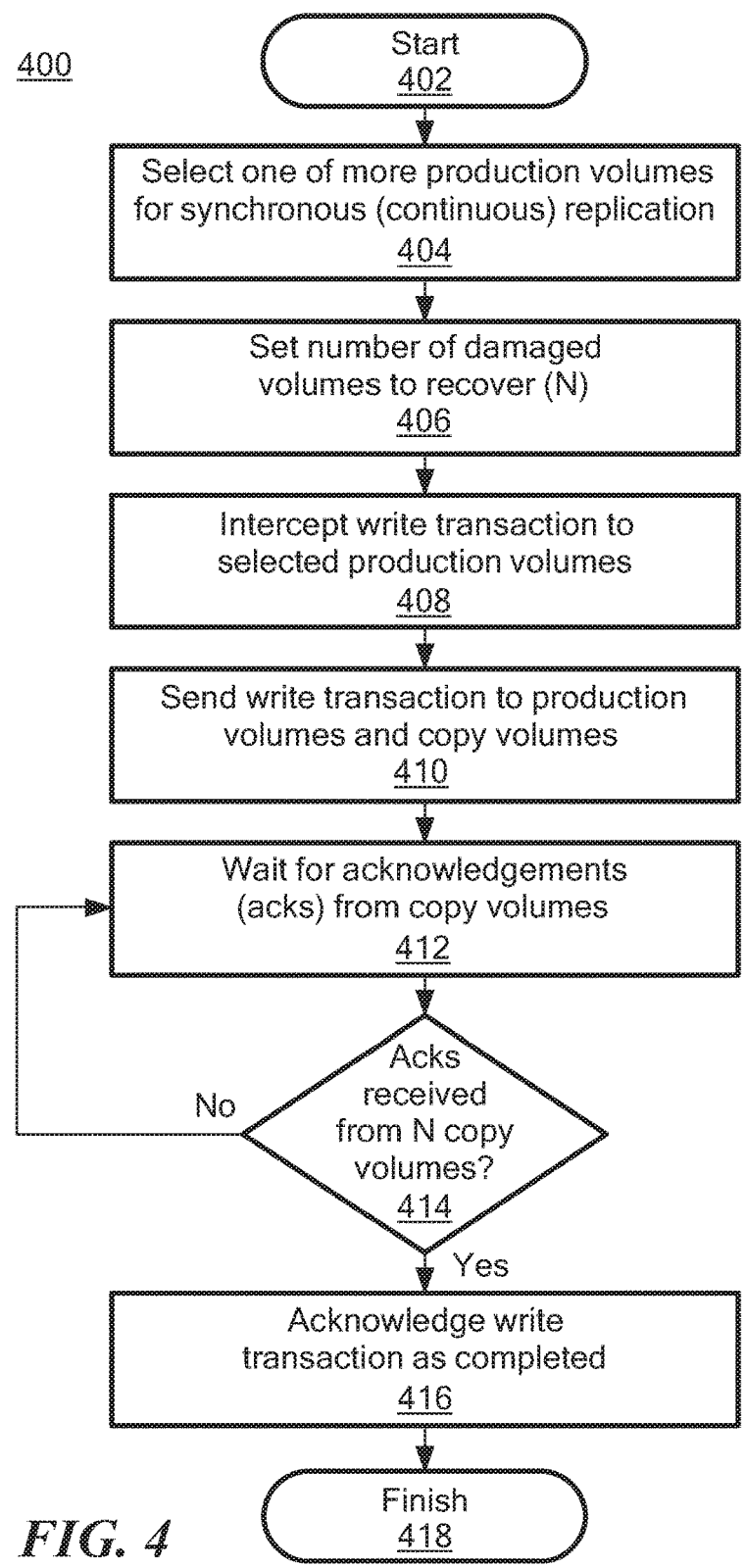
FIG. 4 is a flowchart of an example of a process to create replicas of a production volume, according to an illustrative embodiment of the instant disclosure.

Referring to FIG. 4, described embodiments may employ illustrative process 400 to perform synchronous replication. At block 402, process 400 begins. In some embodiments, at block 404, one or more production volumes are set to employ synchronous (continuous) replication. In some embodiments, some aspects of the continuous replication may be performed as described in U.S. Pat. No. 7,516,287 entitled "Methods and Apparatus for Optimal Journaling for Continuous Data Replication," which is hereby incorporated by reference herein in its entirety. In some embodiments, at block 406, a desired number of volumes, N, that can be damaged and the system can still recover synchronous data may be set, for example by a user of data protection system 100.

In some embodiments, at block 408, write transactions to the production volumes selected at block 404 are intercepted, for example by data protection agent 144. In some embodiments, at block 410, the data protection agent sends the write transaction to the production volumes and the copy volumes. In some embodiments, at block 412, the data protection agent waits to receive acknowledgments (acks) from the copy volumes. In some embodiments, at block 414, process 400 returns to block 412 until acks are received from N copy volumes. In some embodiments, at block 414, once acks are received from N copy volumes, then at block 416, the write transaction is acknowledged as completed, and synchronous replication process 400 completes at block 418.

Figures 5, 6:
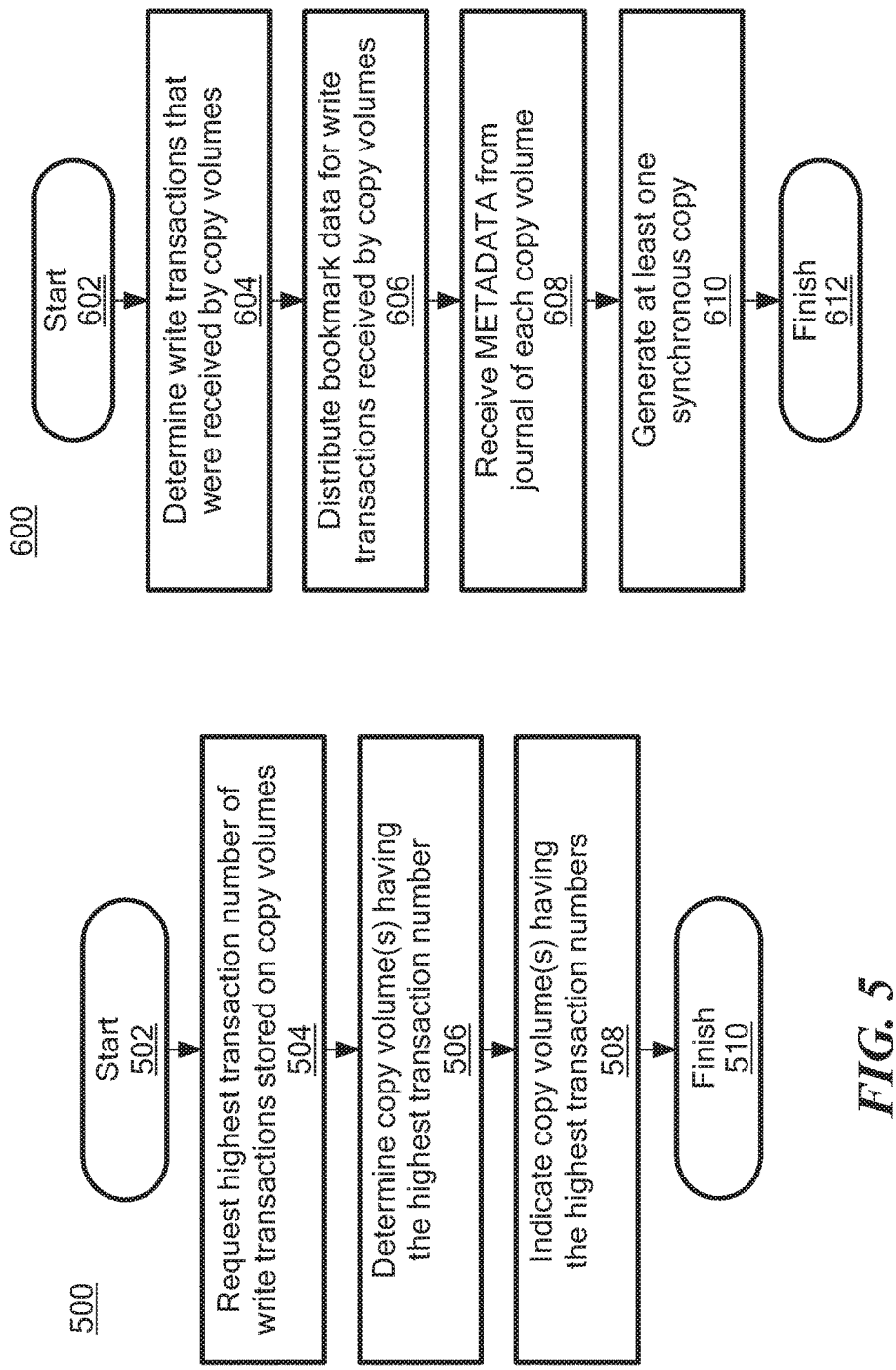
FIG. 5 is a flowchart of an example of a process to verify synchronized replica copies, according to an illustrative embodiment of the instant disclosure.
FIG. 6 is a flowchart of an example of a process to generate a synchronized replica copy, according to an illustrative embodiment of the instant disclosure.

Referring to FIG. 5, some described embodiments may employ illustrative process 500 to verify which ones of the copy volumes contain the most recent data. Process 500 may be employed in systems where an ack of a write transaction implies that all previous write transactions are also acknowledged. For example, such systems may assign a transaction number to each write transaction (e.g., the data protection agent may assign a transaction number to intercepted write transactions). In some embodiments, transaction numbers are unique, monotonically increasing numbers that can identify an order if write transactions. Since some embodiments send write transactions to the copy volumes in the same order the write transactions are sent to the production volume, this order may be maintained for both production and copy volumes. Thus, in described embodiments, if the production volume is damaged, copy volumes containing data from a write transaction having the highest transaction number have the most recent data from the production volume and may provide zero data loss (e.g., zero RPO).

As shown in FIG. 5, at block 502, process 500 begins. In some embodiments, at block 504, the data protection agent (e.g., 144 of FIG. 1) may request that each copy volume provide the highest transaction number for which data is stored. In some embodiments, at block 506, the data protection agent may determine one or more of the copy volumes having a highest transaction number (e.g., multiple volumes may all store the most recent data). In some embodiments, at block 508, the data protection agent may indicate that the one or more copy volumes having the highest transaction number are synchronized with the production volume, for example to use the copy volumes to recover production data in the event of a failure of the production volume. At block 510, process 500 completes.

Referring to FIG. 6, some described embodiments may employ illustrative process 600 to verify which ones of the copy volumes contain the most recent data. Process 600 may be employed in systems where an ack of a write transaction does not imply that all previous write transactions are also acknowledged. For example, such systems may allow two or more write transactions to be processed concurrently (e.g., two or more in-flight write transactions. In embodiments of such a system, no single copy volume may necessarily contain all the write transactions that were performed to the production volume.

In some embodiments, process 600 may be performed, for example, after block 416 of process 400 of FIG. 4. As shown in FIG. 6, at block 602, process 600 begins. In some embodiments, at block 604, the data protection agent (e.g., data protection agent 144 of FIG. 1) may determine one or more write transactions that were received (e.g., acknowledged) by all the copy volumes. In some embodiments, at block 606, only data that was received by all the copies is distributed to a replica (e.g., only bookmarks that were received by all of the copy volumes are distributed to the replica). In some embodiments, at block 608, the data protection agent may receive journal metadata from each copy volume (e.g., DO METADATA of FIG. 2). In some embodiments, at block 610, the data protection agent may generate at least one synchronous copy containing all the write transactions of the production volume. For example, the data protection agent may read the DO METADATA of each copy volume to synchronize the data with the write transactions that were received by all the copy volumes. At block 612, process 600 completes.

Figure 7:
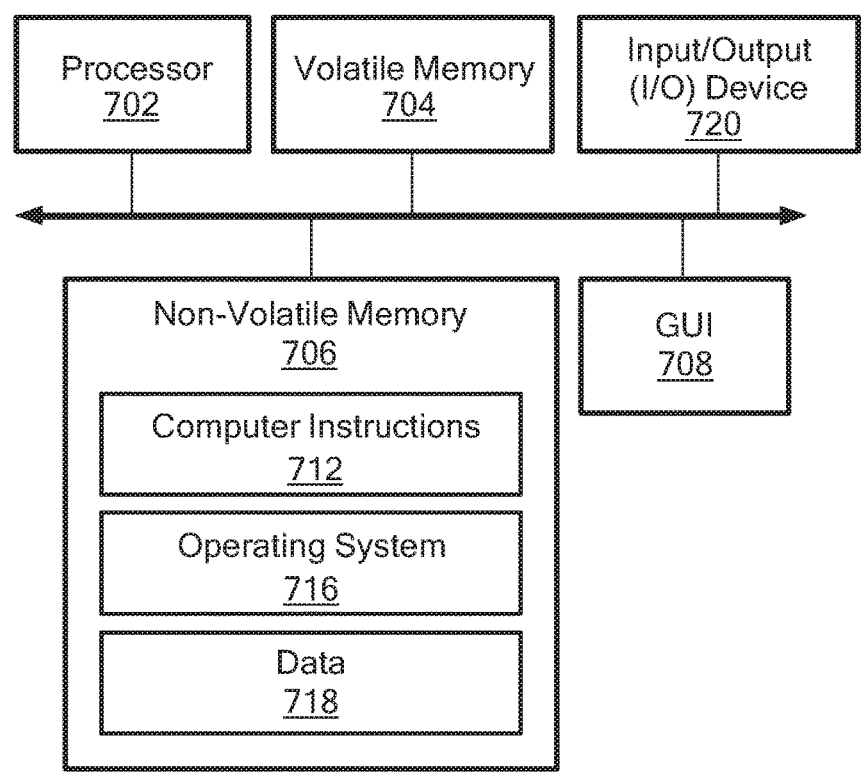
FIG. 7 is a block diagram of an example of a hardware device that may perform at least a portion of the processes in FIGS. 4-6.

In some described embodiments, hosts 104 and 116 of FIG. 1 may each correspond to one computer, a plurality of computers, or a network of distributed computers. For example, in some embodiments, host 104 and/or host 116 may be implemented as one or more computers such as shown in FIG. 7. As shown in FIG. 7, computer 700 may include processor 702, volatile memory 704 (e.g., RAM), non-volatile memory 706 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 718 such that, for example, the computer instructions 712 are executed by the processor 702 out of volatile memory 704 to perform at least a portion of the processes shown in FIGS. 4-6. Program code may be applied to data entered using an input device of GUI 708 or received from I/O device 720.

Processes 400, 500 and 600 (FIGS. 4-6) are not limited to use with the hardware and software of FIG. 7 and may find applicability in any computing or processing environment and with any type of machine or set of machines that may be capable of running a computer program. Processes 400, 500 and 600 (FIGS. 4-6) may be implemented in hardware, software, or a combination of the two.

The processes described herein are not limited to the specific embodiments described. For example, processes 400, 500 and 600 are not limited to the specific processing order shown in FIGS. 4-6. Rather, any of the blocks of processes 400, 500 and 600 may be re-ordered, combined or removed, performed in parallel or in serial, as necessary, to achieve the results set forth herein.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors and/or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical and/or one or more virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

We claim:

1. A method comprising:
   selecting one or more production volumes of a storage system for continuous replication;
   selecting a number, N, associated with a number of damaged volumes the storage system can sustain and maintain data consistency;
   intercepting one or more write transactions from a host to an associated one of the selected one or more production volumes;
   sending the intercepted one or more write transactions to the associated production volume and to a plurality of copy volumes;
   when acknowledgments of the one or more write transactions have been received from N copy volumes, acknowledging the one or more write transactions to the host;
   assigning each of the intercepted one or more write transactions a unique transaction number, the transaction number monotonically increasing based upon an order in which the intercepted one or more write transactions are intercepted; and
   verifying one or more of the plurality of copy volumes as synchronized with an associated production volume based upon the transaction numbers of the intercepted one or more write transactions written to each of the copy volumes.

2. The method of claim 1, wherein verifying one or more copy volumes as synchronized with an associated production volume comprises:
   determining a highest transaction number written to each copy volume;
   determining one or more copy volumes having a highest transaction number; and
   indicating the determined one or more copy volumes as being synchronized with the associated production volume.

3. The method of claim 1, wherein an acknowledgment of a write transaction having an associated transaction number implies acknowledgment of write transactions having transactions numbers lower than the associated transaction number.

4. The method of claim 1, further comprising:
   determining one or more write transactions received by all the copy volumes;
   tracking metadata associated with write transactions received by fewer than all the copy volumes; and
   generating at least one synchronous copy volume based upon the tracked metadata and the one or more write transactions received by all the copy volumes.

5. The method of claim 4, wherein the metadata is tracked in one or more DO METADATA journals, each journal associated with a given copy volume, and wherein generating at least one synchronous copy volume based upon the tracked metadata and the one or more write transactions received by all the copy volumes comprises merging the DO METADATA of each copy volume with the write transactions that were received by all the copy volumes.

6. The method of claim 1, wherein N is an integer greater than zero and less than or equal to a sum of a number of production volumes and a number of copy volumes of the storage system.

7. The method of claim 1, further comprising receiving acknowledgments to the write transaction from one or more additional copy volumes as a background process while processing new write transactions.

8. A system comprising:
a processor; and
memory storing computer program code that when executed on the processor causes the processor to operate a storage system, the storage system operable to perform the operations of:
  selecting one or more production volumes of a storage system for continuous replication;
  selecting a number, N, associated with a number of damaged volumes the storage system can sustain and maintain data consistency, wherein N is an integer greater than zero and less than or equal to a sum of a number of production volumes and a number of copy volumes of the storage system;
  intercepting one or more write transactions from a host to an associated one of the selected one or more production volumes;
  sending the intercepted one or more write transactions to the associated production volume and to the copy volumes; and
  when acknowledgments of the one or more write transactions have been received from N copy volumes, acknowledging the one or more write transactions to the host;
  assigning each of the intercepted one or more write transactions a unique transaction number, the transaction number monotonically increasing based upon an order in which the one or more write transactions are intercepted; and
  verifying one or more of the plurality of copy volumes as synchronized with an associated production volume based upon the transaction numbers of write transactions written to each of the copy volumes.

9. The system of claim 8, wherein the storage system is further operable to perform the operations of:
  determining a highest transaction number written to each copy volume;
  determining one or more copy volumes having a highest transaction number; and
  indicating the determined one or more copy volumes as being synchronized with the associated production volume.

10. The system of claim 8, wherein an acknowledgment of a write transaction having an associated transaction number implies acknowledgment of write transactions having transactions numbers lower than the associated transaction number.

11. The system of claim 8, wherein the storage system is further operable to perform the operations of:
  determining one or more write transactions received by all the copy volumes;
  tracking metadata associated with write transactions received by fewer than all the copy volumes; and
  generating at least one synchronous copy volume based upon the tracked metadata and the one or more write transactions received by all the copy volumes.

12. The system of claim 11, wherein the metadata is tracked in one or more DO METADATA journals, each journal associated with a given copy volume, and wherein the storage system is further operable to perform the operation of merging the DO METADATA of each copy volume with the write transactions that were received by all the copy volumes.

13. The system of claim 8, wherein the storage system is further operable to perform the operation of receiving acknowledgments to the write transaction from one or more additional copy volumes as a background process while processing new write transactions.

14. A computer program product including a non-transitory computer readable storage medium having computer program code encoded thereon that when executed on a processor of a computer causes the computer to operate a storage system, the computer program product comprising:
  computer program code for selecting one or more production volumes of a storage system for continuous replication;
  computer program code for selecting a number, N, associated with a number of damaged volumes the storage system can sustain and maintain data consistency, wherein N is an integer greater than zero and less than or equal to a sum of a number of production volumes and a number of copy volumes of the storage system;
  computer program code for intercepting one or more write transactions from a host to an associated one of the selected one or more production volumes;
  computer program code for sending the intercepted one or more write transactions to the associated production volume and to the copy volumes;
  when acknowledgments of the one or more write transactions have been received from N copy volumes, computer program code for acknowledging the one or more write transactions to the host;
  computer program code for assigning each of the intercepted one or more write transactions a unique transaction number, the transaction number monotonically increasing based upon an order in which the one or more write transactions are intercepted; and
  computer program code for verifying one or more of the plurality of copy volumes as synchronized with an associated production volume based upon the transaction numbers of the one or more write transactions written to each of the copy volumes.

15. The computer program product of claim 14, further comprising:
  computer program code for determining a highest transaction number written to each copy volume;
  computer program code for determining one or more copy volumes having a highest transaction number; and
  computer program code for indicating the determined one or more copy volumes as being synchronized with the associated production volume.

16. The computer program product of claim 14, wherein an acknowledgment of a write transaction having an associated transaction number implies acknowledgment of write transactions having transactions numbers lower than the associated transaction number.

17. The computer program product of claim 14, further comprising:
  computer program code for determining one or more write transactions received by all the copy volumes;
  computer program code for tracking metadata associated with write transactions received by fewer than all the copy volumes; and computer program code for generating at least one synchronous copy volume based upon the tracked metadata and the one or more write transactions received by all the copy volumes.

\* \* \* \* \*